May 19, 1931.      O. C. WHITE      1,805,859
POULTRY FEEDING DEVICE
Filed May 25, 1929
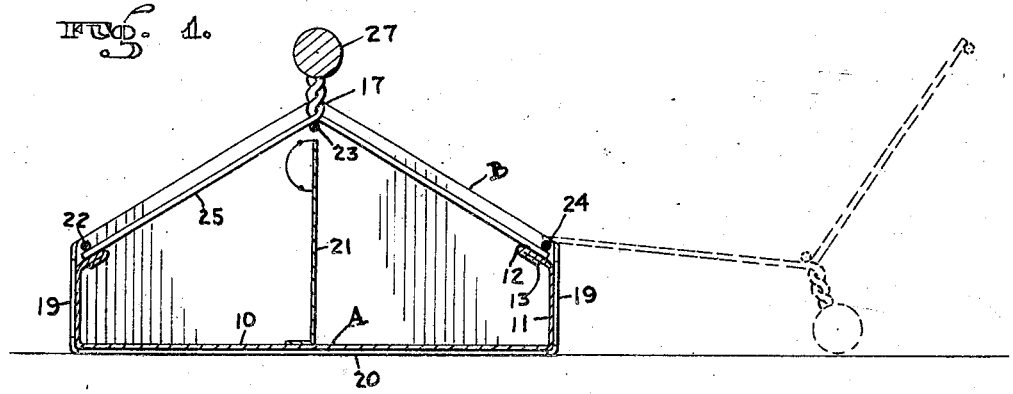
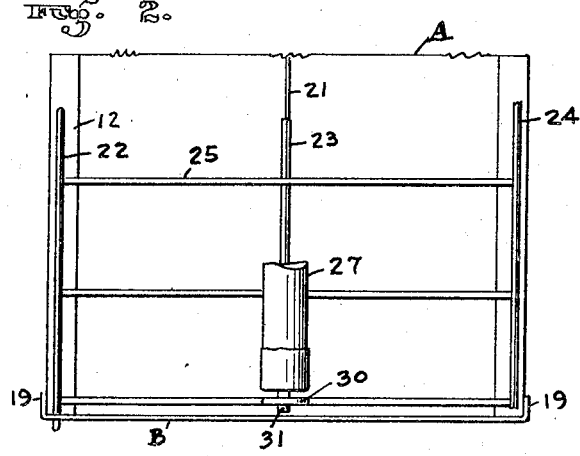
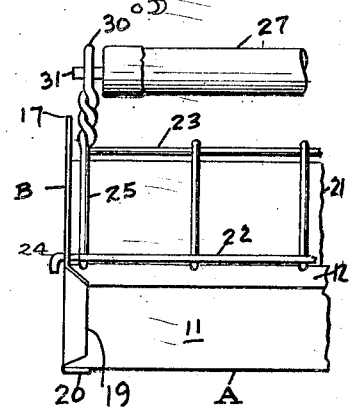
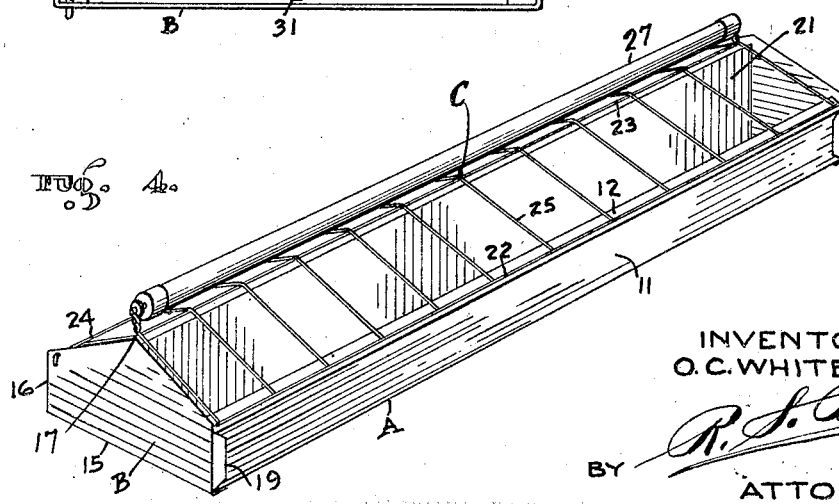
INVENTOR
O. C. WHITE
BY R. S. Berry
ATTORNEY Patented May 19, 1931

1,805,859

UNITED STATES PATENT OFFICE

OLIVER C. WHITE, OF GARDENA, CALIFORNIA

POULTRY FEEDING DEVICE

Application filed May 25, 1929. Serial No. 366,010.

This invention relates to poultry feeding devices and deals particularly with a baby chick feeder.

An object of this invention is to provide a baby chick feeder that allows the chicks easy access to the food, but prevents them from getting into the food trough and contaminating the food with their feet.

Another object is to provide a feeder of the above character wherein the chick guard is easily and quickly turned out of position for purposes of refilling or cleansing the food trough.

Another object is to provide a feed trough having a double compartment for the purpose of serving more than one kind of food.

Another object is to provide a feeder for baby chicks that is so constructed as to prevent the baby chicks from perching on the guard and depositing their droppings in the food.

Another object is to provide a feeder which lends itself readily to economy of manufacture, is light and durable, and has no sharp extending parts liable to injure the chicks.

The foregoing objects and advantages, together with any subsequent features that may be developed in the specifications and claims, constitute my invention, one embodiment of which is shown and illustrated by way of example in the accompanying drawings, in which:

Fig. 1 is a vertical cross of my device near one end;

Fig. 2 is an enlarged fragmentary top plan view of my device;

Fig. 3 is an enlarged fragmentary side elevation showing one end of my feeder;

Fig. 4 is a perspective view of my feeder complete.

Referring to the drawings, my device is seen to include a trough member A having enclosing ends B and a guard member C. The trough member A, in this instance, is formed of flat sheet of metal which is bent into a form having a bottom wall 10, side walls 11 and an inwardly extending sloping wall 12. The inner edge of the sloping wall wall 12 is returned upon itself as shown at 13 to provide a smooth non-cutting edge.

The ends B of the trough are formed of sheet metal and are shaped to fit the configuration of the trough A. Consequently, the ends are each provided with a base 15 that corresponds to the bottom wall 10 of the trough and are also equipped with portions 16 that correspond to the walls 11. The tops of the ends are formed into a gable 17 which is best shown in Figs. 1 and 4.

As a means of attaching the ends B to the trough A, I have provided each end with extensions bent at right angles which are adapted to fit over the outside of the trough and be attached thereto either by spot welding or any other suitable means. Accordingly, the sides 16 are each equipped with an extension 19 and the base 15 with an extension 20. These extensions are adapted to be slipped over the trough A and be attached thereto.

In order to furnish two compartments and provide a feeder wherein two kinds of feed may be served, I have installed a longitudinal partition 21 substantially in the center of the trough. This partition may be spot welded in place or held fixed by any other suitable means.

The guard member C, in this instance, is fabricated of wire. By using three longitudinal wires 22, 23 and 24, respectively, substantially the length of the trough and then by crossing over the wire 23 and under the wires 22 and 24, with a series of spaced wires 25 and welding each intersection and then by bending the wires 25 to conform substantially to the shape of the gable, I form a guard which prevents the chicks from getting into the food with their feet, but leaves ample space for the chick to reach in through the spaced wires 25.

The guard C is pivotally attached to the trough by extending the wire 24, of the guard, at each end through the end pieces B as best shown in Figs. 2 and 3. In order to prevent the ragged end of wire sticking out and injuring chicks, it is bent as shown in Fig. 4. This arrangement permits the guard to be thrown back as shown in Fig. 1.

In some cases, it has been found necessary to prevent the chicks from perching on the top wire 23. To accomplish this, I have provided a roller 27 mounted substantially over the wire 23. The mounting for the ends of the roller are effected by extending the first and last wire of the spaced wires 25 upwardly above the wire 23 and twisting each upon itself to form an eyelet 30 through which the pin 31 extends and rotatably supports the roller 27.

With the loosely mounted roller positioned above the wire 23, it is obvious that the chicks cannot perch on the wire and neither can they stay on the movable roller. Consequently, the feed trough is kept clean from droppings. The sloping wires 25 will tend to gently slide the chicks to the ground as fast as they fall from the roller 27. The consequence of which is to provide a superior feeder for baby chicks.

Having set forth my invention, I am aware that various minor changes may be resorted to, without in any way affecting the function of my device. I therefore reserve the right to make such changes in the nature of refinement as do not depart from the scope of the specifications nor the purview of the appended claims.

I claim:

1. A poultry feeding device, comprising a feeding trough having upstanding ends, and a guard adapted to swing into and out of guard position, said guard being fabricated of spaced wires arranged transversely of the feeding trough and bent substantially in their center to form an angle, a wire connecting the apices of said angle and running substantially parallel with the trough thus forming a ridge, a second wire connecting the ends of said spaced wires on one side of said ridge and running substantially parallel with the trough, a third wire connecting the ends of said spaced wires on the opposite side of said ridge and running substantially parallel with said trough, said third wire extending through the said upstanding ends to form a pivotal connection for said guard.

2. A poultry feeding device, comprising a feeding trough having upstanding ends, and a guard adapted to swing into and out of guard position, said guard being fabricated of spaced wires arranged transversely of the feeding trough and bent substantially in their center to form an angle and including end wires disposed contiguous the upstanding ends of said trough having twisted extensions projecting above their apices terminating in eyelets, a wire connecting the apices of said angle and running substantially parallel with the trough thus forming a ridge, a second wire connecting the ends of said spaced wires on one side of said ridge and running substantially parallel with the trough, a third wire connecting the ends of said spaced wires on the opposite side of said ridge and running substantially parallel with said trough, said third wire extending through the said upstanding ends to form a pivotal connection for said guard, a roller extending substantially over and parallel with said ridge, and pins on the ends of said roller revolubly seated in said eyelets.

In testimony whereof, I have affixed my signature.

OLIVER C. WHITE.